United States Patent
Dimotsis et al.

(10) Patent No.: US 11,981,583 B2
(45) Date of Patent: May 14, 2024

(54) LONGITUDINAL IN-SITU IMPEDANCE AND RESIN MONITORING SENSOR, AND METHOD OF MEASURING AND TRACKING THE MOVEMENT OF HARDNESS IN A WATER SOFTENER UTILIZING THE SAME

(71) Applicant: Ecowater Systems LLC, Woodbury, MN (US)

(72) Inventors: George Dimotsis, Woodbury, MN (US); Malcolm Kahn, Franklin Lakes, NJ (US)

(73) Assignee: Ecowater Systems LLC, Woodbury, MN (US)

( * ) Notice: Subject to any disclaimer, the term of this patent is extended or adjusted under 35 U.S.C. 154(b) by 0 days.

(21) Appl. No.: 18/300,653

(22) Filed: Apr. 14, 2023

(65) Prior Publication Data
US 2023/0249989 A1     Aug. 10, 2023

Related U.S. Application Data

(62) Division of application No. 16/835,959, filed on Mar. 31, 2020, now Pat. No. 11,667,542.

(51) Int. Cl.
| | |
|---|---|
| *C02F 1/00* | (2023.01) |
| *C02F 1/42* | (2023.01) |
| *G01N 27/04* | (2006.01) |

(52) U.S. Cl.
CPC ........... *C02F 1/008* (2013.01); *C02F 1/42* (2013.01); *G01N 27/043* (2013.01); *C02F 2209/055* (2013.01); *C02F 2209/40* (2013.01); *C02F 2303/16* (2013.01)

(58) Field of Classification Search
None
See application file for complete search history.

(56) References Cited

U.S. PATENT DOCUMENTS

| | | | |
|---|---|---|---|
| 4,299,698 | A | 11/1981 | Rak et al. |
| 4,601,201 | A | 7/1986 | Oota et al. |
| 4,603,581 | A | 8/1986 | Yamanoue |
| 5,699,272 | A | 12/1997 | Zabinski |
| 5,843,291 | A | 12/1998 | Eki et al. |
| 6,627,073 | B2 | 9/2003 | Hirota |
| 6,783,684 | B2 | 8/2004 | Teel, Jr. |

(Continued)

FOREIGN PATENT DOCUMENTS

| | | |
|---|---|---|
| WO | 2014033145 | 3/2014 |
| WO | 2014006129 | 9/2014 |
| WO | 2018036612 | 1/2018 |

*Primary Examiner* — Richard C Gurtowski
(74) *Attorney, Agent, or Firm* — DeLio Peterson & Curcio LLC; Robert Curcio

(57) ABSTRACT

A sensor system and process that utilizes impedance/conductivity measurements to track the movement of hardness in an ion exchange media. The impedance/conductivity sensor is a vertical, longitudinally directed, axially lengthwise electrode system having electrodes placed within a bed of ion exchange material and separated by water and the ion exchange material. The electrodes generally run parallel to one another. Hard water is introduced to the water softener and softened by the ion exchange material. A hardness gradient is tracked by the sensor, and regeneration is initiated when it is determined that the ion exchange material is depleted or exhausted.

14 Claims, 16 Drawing Sheets

(56) References Cited

U.S. PATENT DOCUMENTS

| | | |
|---|---|---|
| 7,329,338 B2 | 2/2008 | Sieth |
| 7,556,738 B2 | 7/2009 | Premathilake |
| 7,709,265 B2 | 5/2010 | Chan et al. |
| 8,668,830 B2 | 3/2014 | Soecknick et al. |
| 8,696,912 B2 | 4/2014 | Soecknick |
| 8,709,241 B2 | 4/2014 | Dopslaff et al. |
| 8,758,627 B2 | 6/2014 | Stewart et al. |
| 8,758,628 B2 | 6/2014 | Quinn |
| 8,773,149 B2 | 7/2014 | Soecknick et al. |
| 9,778,299 B2 | 10/2017 | Davis et al. |
| 10,598,530 B2 | 3/2020 | Critchley et al. |
| 11,667,542 B2 * | 6/2023 | Dimotsis ................ G01N 27/02 210/662 |
| 2015/0274545 A1 | 10/2015 | Lim et al. |
| 2016/0202103 A1 | 7/2016 | Heinonen et al. |
| 2016/0297691 A1 | 10/2016 | Dopslaff et al. |

* cited by examiner

| Run | Temp.C | Estimated TH, g | Actual TH, g | Corrected TH, g | % deviation |
|---|---|---|---|---|---|
| 27 | 25 | 28.1 | 25.2 | 26.0 | 3.1 |
| 28 | 25 | 27.5 | 25.6 | 25.5 | -0.3 |
| 32 | 25 | 15.2 | 16 | 15.7 | -1.6 |
| 33 | 25 | 14.4 | 15.1 | 15.1 | 0.1 |
| 34 | 25 | 9.6 | 10.4 | 11.3 | 8.2 |
| 37 | 25 | 9.2 | 10.5 | 10.9 | 4.2 |
| 29 | 25 | 20 | 19.7 | 19.6 | -0.6 |
| 30 | 25 | 21.2 | 20.5 | 20.5 | 0.1 |
| 31 | 25 | 19.2 | 20 | 18.9 | -5.4 |
| 35 | 25 | 9 | 10 | 10.7 | 7.4 |
| 36 | 25 | 14 | 15 | 14.8 | -1.6 |
| 38 | 10 | 25.9 | 24.9 | 24.9 | -0.1 |
| 39 | 10 | 25.8 | 24.8 | 24.8 | -0.2 |
| 42 | 10 | 13.1 | 15.6 | 14.7 | -5.9 |
| 44 | 10 | 12.9 | 15.7 | 14.5 | -7.5 |
| 47 | 10 | 9.1 | 11 | 11.5 | 4.6 |
| 48 | 10 | 9 | 10.5 | 11.4 | 8.8 |
| 56 | 40 | 26.4 | 23.6 | 24.0 | 1.6 |
| 57 | 40 | 26.5 | 24 | 24.1 | 0.4 |
| 58 | 40 | 25.4 | 23.3 | 23.2 | -0.4 |
| 59 | 40 | 24.2 | 22.3 | 22.3 | -0.2 |
| 60 | 40 | 16.5 | 16.2 | 16.1 | -0.3 |
| 61 | 40 | 17.1 | 16.2 | 16.6 | 2.8 |
| 62 | 40 | 15 | 15.4 | 15.0 | -2.8 |
| 63 | 40 | 9.1 | 11 | 10.3 | -6.7 |
| 64 | 40 | 8.6 | 10.3 | 9.9 | -4.3 |

Table 1: Estimation of resin capacity and TH

| Run | Avg. Temp. C | Avg. actual TH, g | $Vo_t$, mV | $Vo_{25}$, mV | Vol., gal | Rc estimated, g | TH estimated, g | Deviation, g |
|---|---|---|---|---|---|---|---|---|
| 27 | 25.3 | 25.2 | 84.5 | 85 | 184 | 2987 | | |
| | | | 89.5 | 90 | 219 | 1916 | 30.4 | -5.2 |
| | | | 94.4 | 95 | 251.3 | 999 | 28.3 | -3.1 |
| 64 | 40.8 | 10.3 | 64.6 | 85 | 462.1 | 3006 | | |
| | | | 68.4 | 90 | 589.3 | 1912 | 8.6 | 1.7 |
| | | | 72.1 | 95 | 701.7 | 1006 | 8.1 | 2.2 |

Plot comparison before and after using eq. 1 and 3

Table2: Corrected TH

| Run | Avg. Temp. C | Avg. actual TH, g | Vo₁, mV | Vo₂ₛ, mV | Vol., gal | Rc estimated, g | TH estimated, g | Deviation, g | Corrected TH, g | Deviation, g |
|---|---|---|---|---|---|---|---|---|---|---|
| 27 | 25.3 | 25.2 | 84.5 | 85 | 184 | 2987 | | | | |
| | | | 89.5 | 90 | 219 | 1916 | 30.4 | -5.2 | 27.8 | -2.6 |
| | | | 94.4 | 95 | 251.3 | 999 | 28.3 | -3.1 | 26.2 | -1.0 |
| 64 | 40.8 | 10.3 | 64.6 | 85 | 462.1 | 3006 | | | | |
| | | | 68.4 | 90 | 589.3 | 1912 | 8.6 | 1.7 | 10.5 | -0.2 |
| | | | 72.1 | 95 | 701.7 | 1006 | 8.1 | 2.2 | 10.1 | 0.2 |

TH deviation with and without correction factor

LONGITUDINAL IN-SITU IMPEDANCE AND RESIN MONITORING SENSOR, AND METHOD OF MEASURING AND TRACKING THE MOVEMENT OF HARDNESS IN A WATER SOFTENER UTILIZING THE SAME

BACKGROUND OF THE INVENTION

1. Field of the Invention

The present invention relates to a sensor system and process that utilize an impedance sensor to track the movement of hardness in an ion exchange media, such as a water softener, water refiner, or similar type system, including systems encompassing conductive material and are designed to be regenerable. The impedance measurements may be coupled with, and/or used to determine, measurements of capacity of the ion exchange media and measured water flow, ultimately to ascertain the level of hardness of the incoming water.

2. Description of Related Art

Water systems using groundwater as a source are generally susceptible of water hardness. As water moves through soil and rock it dissolves small amounts of naturally-occurring minerals and carries them into the groundwater supply. Water is known to be a great solvent for calcium and magnesium, so if the minerals are present in the soil around a water-supply well, the hard water may be delivered to homes. Therefore, water hardness varies as a function of geography. For example, in areas within the United States where the water is relatively hard, industries might have to spend money to soften their water, as hard water can damage equipment. Hard water is known to shorten the life of water heaters, fabrics and clothes and clog other water equipment, such as shower and sink faucets.

Furthermore, incoming hardness may fluctuate due to changes in blending of different water sources. For example, in the winter a ground water source may be used and in the summer a surface water source may be used. The hardness of these water sources is most likely different at least in concentration, if not in type of minerals as well. Additionally, a municipality generally has more than one water source, feeding from a number of wells. These wells typically have different hardness concentrations. Depending on which well is supplying water, the hardness in the source water delivered to a water softener will fluctuate. This makes for appreciable variations in feed water hardness.

Calcium and magnesium dissolved in water are the two most common minerals that make water "hard." The degree of hardness becomes greater as the calcium and magnesium content increases and is related to the concentration of multivalent cations dissolved in the water.

The hardness of water is generally referred to by three types of measurements: grains per gallon, milligrams per liter (mg/L), or parts per million (ppm). General guidelines for classification of waters are typically: 0 to 60 mg/L (milligrams per liter) of calcium carbonate is classified as soft; 61 to 120 mg/L is classified as moderately hard; 121 to 180 mg/L is classified as hard; and more than 180 mg/L is classified as very hard.

Table I below depicts the general hardness classification categories of water:

TABLE I

| Grains per Gallon | Milligrams per Liter (mg/L) or Parts per Million (ppm) | Classification |
|---|---|---|
| 0-3.5 | 0-60 | Soft to Slightly Hard |
| 3.5-7.0 | 60-120 | Moderately Hard |
| 7.0-10.5 | 120-180 | Hard |
| over 10.5 | over 180 | Very Hard |

Hard water may form deposits that clog plumbing. These deposits, referred to as "scale", are composed mainly of calcium carbonate ($CaCO_3$), magnesium hydroxide ($Mg(OH)_2$), and calcium sulfate ($CaSO_4$). Calcium and magnesium carbonates tend to be deposited as off-white solids on the inside surfaces of pipes and heat exchangers. This precipitation (formation of an insoluble solid) is principally caused by thermal decomposition of bicarbonate ions but also happens in cases where the carbonate ion is at saturation concentration. The resulting build-up of scale restricts the flow of water in pipes. In boilers, the deposits impair the flow of heat into water, reducing the heating efficiency and allowing the metal boiler components to overheat. In a pressurized system, this overheating can lead to failure of the boiler.

The presence of ions in an electrolyte, in this case, hard water, can also lead to galvanic corrosion, in which one metal will preferentially corrode when in contact with another type of metal, when both are in contact with an electrolyte.

Conductivity is a measure of water's capability to pass electrical flow. This ability is directly related to the concentration of ions in the water. These conductive ions come from dissolved salts and inorganic materials such as alkalis, chlorides, sulfides, and carbonate compounds. The more ions that are present, the higher the conductivity of water. Likewise, the fewer ions that are in the water, the less conductive it is. Distilled or deionized water can act as an insulator due to its very low (if not negligible) conductivity value. In contrast, sea water has a very high conductivity.

Conductivity can also measure total dissolved solids (TDS). Total dissolved solids combine the sum of all ionized particles that are generally smaller than 2 microns. This includes all of the disassociated electrolytes that make up salinity concentrations, as well as other compounds such as dissolved organic matter. The higher the level of TDS (ppm), the higher the degree of water hardness. (Using the chart above, 1 grain of hardness is approximately 17.1 ppm (mg/L) in TDS.) This means that the measure of conductivity directly correlates to the measure of ions that contribute to water hardness.

In North America and many other countries, the water quality changes seasonally as sources are changed or weather conditions change. Thus, while a softener supplier or customer sets up or performs the initial softener commissioning step in order for the softener to optimally perform at the hardness measured during the installation, any subsequent changes in the feed water will result in poor performance—either the customer will periodically get untreated water or they will have poor water and salt efficiencies.

Many consumers use water softeners to soften the water used in their homes, the work place, schools, etc. These water softeners are typically preset to soften water of a predefined degree of hardness.

A water softener includes a resin tank or vessel that is filled with ion exchange resin comprising thousands of small spherical polymeric beads of cross-lined polystyrene sulfonic acid, and is generally referred to as a cation resin. The cation resin is added to a processing vessel, such as within a water softener. The vessel generally has internal piping and fine screens to prevent the resin beads from washing away.

The resin is usually placed into service with Na$^+$ ions on the beads. When hardness ions come into contact with the Na ions bound to the resin, they exchange—that is, one calcium ion displaces two Na ions that were originally bound to the resin bead, and the Na$^+$ ions are subsequently released into the water. In some instances, potassium (K) is used as the exchange ion.

Incoming water flows down through the resin bed and leaves either through the bottom outlet of the vessel or through a transfer tube back up to the top of the vessel. This is generally referred to as a service cycle. As the incoming water rich in calcium and magnesium passes through the bed, it contacts the resin bead surfaces and the minerals are replaced by the sodium ions.

In addition to hardness ions, the resin exchange process also picks up iron ions if they are present in the water and reduces the capacity of the resin bed for hardness exchange.

Importantly, the chemical reaction within this vessel is reversible. Like any chemical process, the resin has a finite capacity to exchange calcium (Ca$^{++}$) and magnesium (Mg$^{++}$) for the equivalent of sodium (Nat). Eventually the resin becomes saturated with Ca$^{++}$ and Mg$^{++}$ and will no longer be removed. At that point the resin is exhausted and requires regeneration.

In this process there is a point of hardness breakthrough or saturation. When hardness breakthrough occurs, the resin is saturated and non-removed Ca$^{++}$ and Mg$^{++}$ pass directly through the bed and raise the hardness level of the effluent water leaving the softener.

When the hardness minerals are trapped in the resin and removed from the water, the water becomes "soft". However, once the water softener resin gets completely exchanged or covered with hardness minerals it needs to be regenerated.

During the regeneration process, the water softener floods the resin with brine water, a saturated concentration of either Na$^+$ or K that is slowly passed through the system. This saturated solution performs a reverse ion exchange, replacing the calcium and magnesium with Na$^+$ or K, and the hardness flows out of the system to drain. After a thorough rinse to remove any excess brine, the softening resin in the water softener is then ready to soften water again.

When a water softener is first installed, the hardness of the incoming water is typically tested and input as one component of the softener's operating algorithm or regeneration timer. This hardness measurement, for example, the measurement of iron, if tested, consumes a small volume of a softener's resin capacity and provides a reasonable estimation of the system's capacity at startup. While in other softener installations, the hardness is only estimated, which will typically result in less efficient operation and performance.

However, some incoming water chemistry can change dramatically from season to season, or even during a single day, based on a municipality changing or blending their raw water sources. In addition, some customers and/or government entities wish to have water that is only partially softened, typically to minimize the amount of sodium in the softened water, and do so by blending untreated water with softened water, typically using a manual blending valve that is set statically at the time of installation based on the hardness values at that time. Knowing the true hardness of the water in real-time, perhaps if possible, based on the rate of resin bed depletion, would improve the accuracy of the blending and even allow for blending in-situ using an automated blending valve controlled by the system's electronics and algorithms.

Finally, it is known that resin ages over time and is not able to fully regenerate, thereby losing some of its capacity. It is desirable to understand this capacity change based on the volume of sodium used to regenerate versus the measured capacity of the softener actually regenerated, such that a softener's learning algorithm can be determined to modify the regeneration cycle and maintain and/or optimize the softener's capacity over time. Accordingly, a one-time measurement of water hardness is not sufficient for optimal system performance, nor is it amenable for in-situ blending.

Point sensors that detect changes in conductivity in an ion exchange resin bed are typically situated in the bed so that about 20% of the volumetric capacity of the bed is held in reserve.

The height at which the point sensor is placed may be set at a higher height if the water hardness is significantly higher than 20 gpg. If the water is at a lower hardness level it may be set at a slightly lower height. When the point sensor detects that the softener has been exhausted at that bed height then the system may be set to regenerate immediately or at a delayed regeneration time.

As noted, these sensors are point-locators that register when depletion of the resin bed reaches a predetermined level.

Regeneration can be initiated based on time of day, time intervals, or total flow through the exchange tank. In some applications, especially when there is a variable concentration of ions to be removed, time or flow-based intervals may not be satisfactory. Under these conditions, either regeneration may not occur until after the tank has been exhausted or energy and resources may be wasted by regenerating too soon or too often.

SUMMARY OF THE INVENTION

Bearing in mind the problems and deficiencies of the prior art, it is therefore an object of the present invention to provide a sensor system and process that utilizes conductivity, impedance, or both, to track the movement of hardness in an ion exchange material within a water softener.

Another object of the present invention is to provide a method for measuring and tracking the movement of hardness in ion exchange material, typically known as the "Hardness Front" in a water softener using conductivity and/or impedance measurements.

Still other objects and advantages of the invention will in part be obvious and will in part be apparent from the specification.

The above and other objects, which will be apparent to those skilled in the art, are achieved in the present invention which is directed to an apparatus for producing a signal indicative of a state of the exhaustion or depletion of an ion exchange material in a vessel, comprising: the vessel having an axial length traversing in a longitudinal direction from approximately vessel top to approximately vessel bottom; the ion exchange material within the vessel; a conductivity, resistivity, and/or impedance sensor for determining the exhaustion or depletion of the ion exchange material, the conductivity or impedance sensor including at least two electrodes in electrical communication with one another, wherein the electrodes extend continuously approximately throughout the axial length of the vessel in the longitudinal direction; and a controller for producing a signal to the electrodes and/or receiving a signal from the electrodes representing a conductivity or impedance measurement between the electrodes.

The apparatus includes a hard water input; a soft water output; a regeneration supply solution for regenerating the ion exchange resin; a drain or regenerating waste stream; a water softener or regeneration valve; and an admixing or blending device for mixing output fluid.

Each of the electrodes may comprise a wire conductor formed of conductive material which are situated to run generally parallel to one another.

In at least one embodiment, the electrodes traverse along or inside a tube internal to the vessel while in contact with the ion exchange material, and are set apart as the electrodes progress approximately throughout the axial length of the vessel in the longitudinal direction.

The electrodes may progress approximately throughout the axial length of the vessel in the longitudinal direction approximately parallel to one another.

The electrodes may progress approximately throughout the axial length of the vessel in the longitudinal direction, wherein each electrode is formed of sequential curved and straight segments such that the curved segments of each electrode are parallel to one another and the straight segments of each electrode are parallel to one another.

Alternatively, the electrodes progress approximately throughout the axial length of the vessel in the longitudinal direction, wherein the electrodes are separated a predetermined distance that varies throughout the axial length of the vessel in the longitudinal direction.

The apparatus may include a plurality of electrode pairs having different lengths extending in the longitudinal direction such that at least one electrode pair progresses approximately throughout the axial length of the vessel in the longitudinal direction, and other electrode pairs have varying lengths shorter than a longest length electrode pair.

The controller includes operational software to calculate the average impedance, conductivity, or resistivity of the ion exchange material within the vessel, wherein the average impedance, conductivity, or resistivity is proportional an amount of regeneration of the ion exchange material within the vessel.

The controller may include operational software to track resistivity of the ion exchange material as a function of water volume through the apparatus.

The controller may include operational software to calculate and monitor the relationship between resistivity of the ion exchange material and capacity of the ion exchange material being depleted.

The controller may further include operational software to compare input volume of water flowing into the vessel to capacity of ion exchange material being used or depleted, and from this comparison, compare the capacity to resistivity measured by the conductivity, resistivity, and or impedance sensor, such that capacity of the ion exchange material can be ascertained in-situ.

In a second aspect, the present invention is directed to an apparatus for producing a signal indicative of the state of the exhaustion or depletion of an ion exchange material in a vessel, comprising: the vessel having an axial length traversing in a longitudinal direction from approximately vessel top to approximately vessel bottom; the ion exchange material within the vessel; a conductivity or impedance sensor for determining the exhaustion or depletion of the ion exchange material, the conductivity or impedance sensor including at least two electrodes in electrical communication with one another, wherein the electrical communication between the electrodes is interrupted by a plurality of insulators spaced apart axially to form non-conductive gaps between the electrodes that extinguish conduction between adjacent insulation portions on each electrode to enable segment-wise continuous electrical communication between electrode portions not interrupted by insulators throughout the axial length of the vessel in the longitudinal direction; and a controller for producing a signal to the electrodes and/or receiving a signal from the electrodes representing a conductivity or impedance measurement between the electrodes.

This apparatus may include: a hard water input; a soft water output; a regeneration supply solution for regenerating the ion exchange resin; a drain or regenerating waste stream; a water softener or regeneration valve; an admixing or blending device for mixing output fluid; and a lower diffuser plate.

In a third aspect, the present invention is directed to a water treatment system having a tank containing a particle bed for removing minerals from water flowing through the tank, and a measuring apparatus for measuring conductivity and/or impedance within the tank, comprising: a hard water input; a soft water output; the particle bed including ion exchange material within the tank; a regeneration supply solution for regenerating the ion exchange material; a drain or regenerating waste stream; a water softener or regeneration valve; an admixing or blending device for mixing output fluid; the tank having an axial length traversing in a longitudinal direction from approximately tank top to approximately tank bottom; a conductivity or impedance sensor for determining exhaustion or depletion of the ion exchange material, the conductivity or impedance sensor including at least two electrodes in electrical communication with one another, wherein the electrodes extend continuously approximately throughout the axial length of the vessel in the longitudinal direction, the electrodes in contact directly with the ion exchange material for impedance measurements or indirectly with the ion exchange material for conductivity measurements; and a controller for producing a signal to the electrodes and/or receiving a signal from the electrodes representing a conductivity or impedance measurement between the electrodes.

The water treatment system may include a tube traversing in the longitudinal direction from approximately the tank top to approximately the tank bottom, the tube directing fluid flow either upwards towards the tank top, or downwards toward the tank bottom. And, the electrodes can be supported by the tube.

Conductivity measured by the electrodes corresponds to a change in ion exchange material from $Na^+$ to $Ca^{2+}$ and/or $Mg^{2+}$.

In a fourth aspect, the present invention is directed to a method for measuring and tracking the movement of hardness in a water softener, the method comprising: introducing hard water from a point of entry into a vessel containing a particle bed of ion exchange material; electrically connecting a controller to electrodes; situating the electrodes within the vessel such that the electrodes traverse an axial length of the vessel in a longitudinal direction from approximately vessel top to approximately vessel bottom within the particle bed of ion exchange material; measuring impedance, conductivity, and/or resistivity between electrodes using the controller; calculating from the impedance, conductivity, and/or resistivity measurements a state of the exhaustion or depletion of the ion exchange material in the vessel; initiating a regeneration of the ion exchange material upon determination of exhaustion or depletion of the ion exchange material.

The step of initiating the regeneration further includes ceasing inflow of the water and pumping a regenerate into the ion exchange material.

The method further includes: utilizing historical data on water usage as a function of time to assist in determining the step of initiation of the regeneration; pumping the regenerate into the ion exchange material from a direction opposite that of water flow during normal operation; and/or monitoring the impedance, conductivity, and/or resistivity to determine when a regenerate trailing edge or front is removed from the ion exchange material.

The method may include initiating a slow rinse followed by a fast rinse, and monitoring the conductivity and/or impedance during either or both of the rinses to determine when either or both of the rinses are complete based on impedance, conductivity, and/or resistivity changes.

The method may also include introducing hard water to the water softener, and identifying a new hardness front by measuring impedance, conductivity, and/or resistivity between the electrodes.

The method may include introducing a blending valve to blend the hard water with softened water if a mixture of hard water/softened water combination is desired.

The method may include calculating and monitoring the relationship between impedance, conductivity, and/or resistivity of the ion exchange material and capacity of the ion exchange material being depleted.

The method may also include comparing input volume of water flowing into the vessel to capacity of ion exchange material being used or depleted, and from this comparison, comparing the capacity to impedance, conductivity, and/or resistivity measured by the electrodes, such that capacity of the ion exchange material can be ascertained in-situ; and/or calculating the run-to-run conductivity of a given amount of brine solution to resin capacity to gauge the use life of the resin and suggest replacement time.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
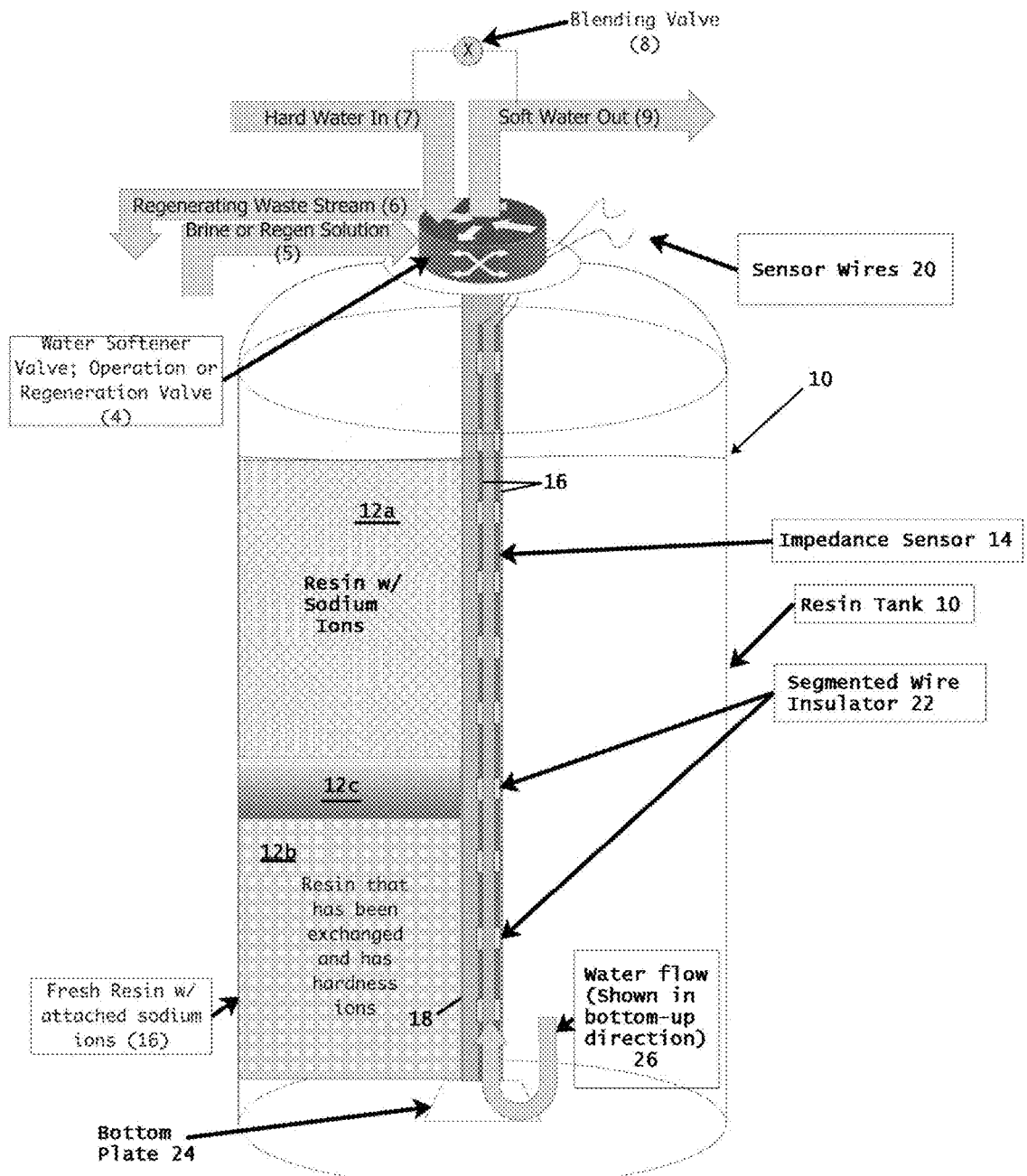
FIG. 1 depicts a cross-sectional, perspective view of one embodiment of a longitudinal impedance sensor for use in a water softener tank.

In describing the preferred embodiment of the present invention, reference will be made herein to FIGS. 1-28 of the drawings in which like numerals refer to like features of the invention.

A hardness sensor directed longitudinally or lengthwise through a resin bed-based water softener vessel, and a process to optimize the hardness measurement is presented. Water softeners, water refiners, or similar type systems, including systems that are regenerable, are considered. Together, the sensor, process, and monitored flow rate of such a system can be used to predict when a water softener will exhaust its capacity and require regeneration or replacement. The prediction of exhaustion can also be used to cause a regeneration of the system prior to exhaustion, and/or at a convenient time when water is not required, so that treated water is always supplied. In addition, the sensor and process can be used to monitor how much of the system's capacity has actually been regenerated during a regeneration cycle rather than assuming averages based on the estimated volumes or weight of a regenerant being injected into the system during a regenerating cycle. The sensor, process, and monitored flow rate can also be used to commission a water softener, without having to input an initial hardness measurement, by automatically calculating incoming water hardness based on the rate of exhaustion of the bed and the flow of water through the system. In addition, the device and process can be used to monitor and adjust for water hardness, including hardness changes during a day, aging of the resin bed, and other factors affecting the holding capacity of the resin, including water velocity, that can impact performance and capacity. Such capability can also be used to accurately blend treated and untreated water in-situ in order to achieve a desired output hardness from the system where fully softened water is not desired. Furthermore, by knowing the incoming hardness and how it changes over time, one can estimate the outgoing sodium level contributed by the softener and allow users to blend softened and unsoftened water, either manually or with an automated blending valve, to achieve a lower sodium level in their water if desirable. Moreover, the location of the hardness threshold in the resin bed may be ascertained, which may facilitate predictive capabilities of the water softener system.

The sensor of the present invention will now be described in conjunction with a water-softening apparatus. It is to be understood that the water softening apparatus described in conjunction with the description of the sensor of the present invention is but one example of a resin-type ion exchange apparatus to which the sensor of the present invention may be applied, and the invention is not limited solely to water softeners.

Softener regeneration, the process of removing calcium, magnesium, iron (and possibly other ions) from absorbing resin is an area of water treatment where improved monitoring is beneficial. The processes currently in the art are often imprecise since they are based on an approximation of how much sodium or other chemical was used in regeneration. Furthermore, it is inefficient to attempt to regenerate the entire resin bed since this requires a disproportionate amount of sodium to do so and most modern softeners tend to only partly regenerate in order to have an efficient use of sodium.

A resin bed cannot typically be one hundred percent (100%) regenerated in normal use, even with what is known as a "maximum salt dose." Thus, knowing how much of the resin bed was actually regenerated by monitoring the movement of sodium through the bed with a longitudinally directed sensor design having electrodes that may or may not be segmented, and/or by looking at the time it took for the sodium to reach the top of the sensor, and how long it took for the bottom of the sensor to react to a clearing of the "salt front", would improve the system's accuracy and troubleshooting capability. It would also provide the system's algorithm with valuable information about the true capacity of the regenerated resin bed for more efficient operation.

The ability to accurately monitor the remaining capacity of a softener, along with a learning algorithm that can predict the timing of water usage-based customer usage patterns, would allow regeneration at different times during a day rather than setting the regeneration for a fixed time.

In this manner, the present invention encompasses a water softener device having an ion exchange resin bed, a regeneration solution supply for regenerating the ion exchange resin when it is depleted, an admixing or blending device for mixing output water, and an impedance sensor (capable of measuring conductivity, resistivity, capacitance) for determining the depletion of the ion exchange resin bed through conductive measurements. The impedance sensor is preferably in the form of a vertical, longitudinally directed (e.g., axially lengthwise with respect to the water softener vessel), electrode system, referred herein as a longitudinal impedance sensor. It should be noted that conductivity, resistivity, and/or capacitance measurements—all relational to impedance—may be empirically determined, and such measurement that ultimately infer impedance are within the scope of the present invention.

FIG. 1 depicts a cross-sectional, perspective view of one embodiment of a longitudinal impedance sensor for use in a water softener tank 10 having a resin bed 12a,b,c of ion exchange material for removing hardness, where as an exemplary embodiment, a portion of resin bed 12a,b,c is shown having distinct sections. The ion exchange material is capable of receiving hard water ions during the softening operation and releasing the hard water ions during the regeneration operation of the water softener. Generally, the ion exchange material comprises polymer beads with functional groups attached to provide the ion exchange function. The ion exchange may be cation- or anion-exchange depending upon the particular functional group selected. Ion exchange resin is utilized in the preferred embodiment, although the operation of a longitudinal impedance sensor is not prohibited by using other ion exchange material.

Hard water 7 is introduced to the water softener device through valve 4, which can be a water softener valve, operation valve, and/or regeneration valve, or a combination thereof. Brine or regeneration solution 5 enters valve 4 as needed into the water softener device tank 10. A regenerating waste stream 6 exits valve 4, as well as the treated soft water output 9. The direction of regeneration may be concurrent with the initial water flow (co-flow) or counter to the initial water flow (counter-flow).

Section 12a of the resin bed is that portion of the resin bed that is populated with sodium ions (salts). Sodium salts are preferred, and are ubiquitous in water softeners; however, other soluble salts may be utilized, such as for example a potassium salt. Water, when added within the water softener tank, combines with the salt to form a saturated brine. During regeneration, the brine is brought in contact with the ion exchange resin. Section 12b is that portion of resin bed that has had its sodium ions exchanged (depleted), and thus holds the exchanged hardness ions.

A hardness gradient front or region, exemplifying the exchange, is depicted by section 12c. In a first embodiment, a segmented longitudinal impedance sensor 14 is introduce situated on the outside of a central support tube 18 in direct contact with the resin and traverses axially (longitudinally) approximately from the top to the bottom of tank 10. This may be along the tank's central axis in a defined longitudinal direction on central tube 18, or may be at a location off the center axis.

Longitudinal impedance sensor 14 is preferably constructed of at least two wire conductors 16 formed from conductive material and generally running parallel to one another. In the embodiment depicted in FIG. 1, the conductors 16 traverse along tube 18, and are set apart a predetermined distance as they progress vertically down through the resin bed. As depicted in FIG. 1, in this first embodiment longitudinal impedance sensor wires or conductors 16 are segmented with insulators 22 spaced apart vertically providing for non-conductive gaps in the conductive sensor. The insulators 22 serve to extinguish any conduction between adjacent insulation portions on each wire 16. In this manner, the electrical communication between electrodes is segment-wise continuous. The segmented longitudinal impedance wires or conductors provide for a digitization of the conductor output and assist in locating more precisely the hardness gradient insomuch as there exists a conductive "gap" at each insulator section helping to establish a digital reading; however, a non-segmented design, where the impedance sensor wires or conductors axially traverse the vessel uninterrupted, can be employed with sufficiently effective results.

External input/output (I/O) sensor wires 20 are connected electrically to the longitudinal impedance sensor wires 16. Sensor wires 20 extend outside tank 10 and connect with electronics (not shown) that drive signals through the longitudinal impedance wires 16. The external sensor wires 20, connected to signal electronics, establish a signal in the longitudinal impedance wires 16 to create a measurable impedance, resistivity, and/or conductance between the wires, whether between a pair of wires or multiple wires.

The conductors are situated within an ion exchange resin tank 10 and are in contact directly with the resin. The conductors may be imbedded for conductance, partially blocked with insulators 22 as depicted in FIG. 1, or in a second embodiment, fully exposed without an insulator segment.

In a separate embodiment, tube 18 may actually represent two separate fluid flow paths—one flow path for upward flow, and a second flow path for downward flow, depending upon the softener design. In the embodiment of FIG. 1, resin bed portion 12a depicts depleted or exchanged resin of a downward flow design, insomuch as the depleted portion is above the hardness gradient 12c and the non-depleted resin 12b. A reverse scenario would occur for an upward flow configuration.

A bottom plate 24 is shown employed to redirect water flow from the outside of tube 18 into tube 18 and upward towards a water softener valve in the direction of arrow 26.

In an exemplary embodiment of a vertical, longitudinal conductor design, a set of two vertical conductors or electrodes were fixed in a resin bed to a central riser tube, wherein the conductivity measured by the two vertical electrodes responds to a change in resin form from $Na^+$ to $Ca^{2+}$ or $Mg^{2+}$. Each conductor being comprised of a stainless steel flat or shaped profile strand (e.g., SS-304), having an exemplary length on the order of 24 cm±2 mm, and in the case of a shaped wire profile, having a diameter of about 2.0 mm±0.1 mm.

It has been further realized that although stainless steel material yielded favorable results, the material is not adequately corrosion resistant in a water softener environment. The iron lead to considerable rapid corrosion to the electrodes. In this regard, electrodes plated with a more inert metal coating, such as a noble metal, will deter corrosion. Electrodes, including those having a titanium or copper base metal, may be plated with platinum, gold, or other inert or less corrosive material.

Distance between electrodes in the exemplary embodiment was 12.5 mm±0.2 mm; however, depending upon the characteristics of the electrode material, the signal strength, and sensor electronics sensitivity, the design may allow for the distance between the conductors to be closer together or further apart. These electrodes were fixed to the raiser or central tube 18 above the lower diffuser plate as shown in FIG. 1. Electrodes were made sure not to be exposed to water outside the resin bed and to remain in the resin bed. This was accomplished by limiting the active electrode length—the length of the electrode capable of signal transmission—to approximately 2 cm below resin bed top surface. Additionally, the bottom of the electrode is located approximately 2.5 cm above lower diffuser plate.

Figure 2A:
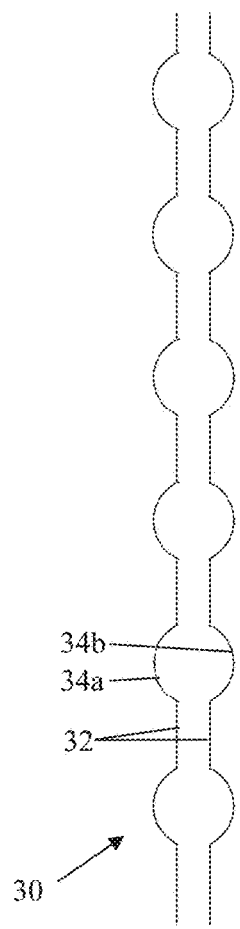
FIG. 2A depicts a segmented design for the electrodes used in a longitudinal impedance sensor, where each electrode is patterned to include substantially straight portions and complementary opposing concave curvatures that are curved to form an electrode separation gap greater than that provided by the substantially straight portions.

FIG. 2 depicts different geometries for the electrodes. FIG. 2a depicts a segmented design 30 where each electrode is patterned to include substantially straight portions 32, and complementary opposing concave curvatures 34a,b that are curved to form an electrode separation greater than that provided by the substantially straight portions 32. The pattern is repeated through the length of the electrodes. The distance between the curved portions affects the signal transmission such that sensor electronics can ascertain the location on the electrode where a measurement is being made. In this manner, the signal on average would be less affected by those curved portions of the electrode that were further apart, so as to serve a similar desired result as the insulated sections of the electrodes 16 of FIG. 1.

Figure 2B:
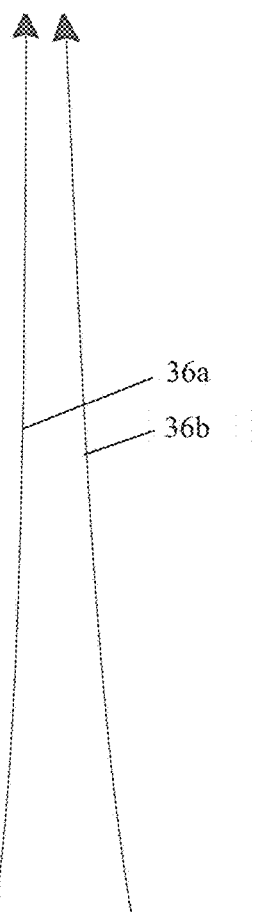
FIG. 2B depicts an electrode geometry used in a longitudinal impedance sensor where the electrodes diverge from one another over the course of the length of the electrodes as they traverse the length of the vessel.

FIG. 2b depicts an electrode geometry where the electrodes 36a,b diverge from one another over the course of the length of the electrodes, as they traverse the length of the vessel. In this manner, the signal transmission is affected as a function of length, thus allowing applicable signal electronics to locate the point of measurement, and therefore the point of the regeneration gradient. It may be beneficial to have the electrodes in closer proximity at the bottom of the vessel so as to have a more sensitive measurement when the exhaustion wave front eventually reaches this lower portion of the bed.

Figure 2C:
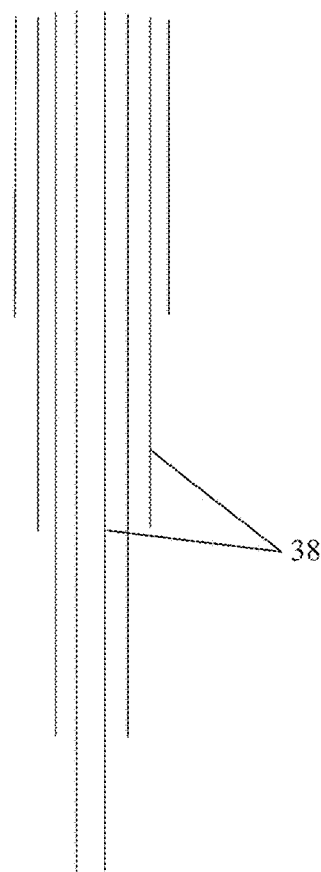
FIG. 2C depicts an electrode geometry used in a longitudinal impedance sensor where a plurality of electrodes is presented having different lengths traversing the length of the vessel as another way to ascertain the location of the regeneration gradient.

FIG. 2c depicts an electrode geometry where a plurality of electrodes 38 are presented having different lengths traversing the length of the vessel as another way to ascertain the location of the regeneration gradient.

Figure 3:
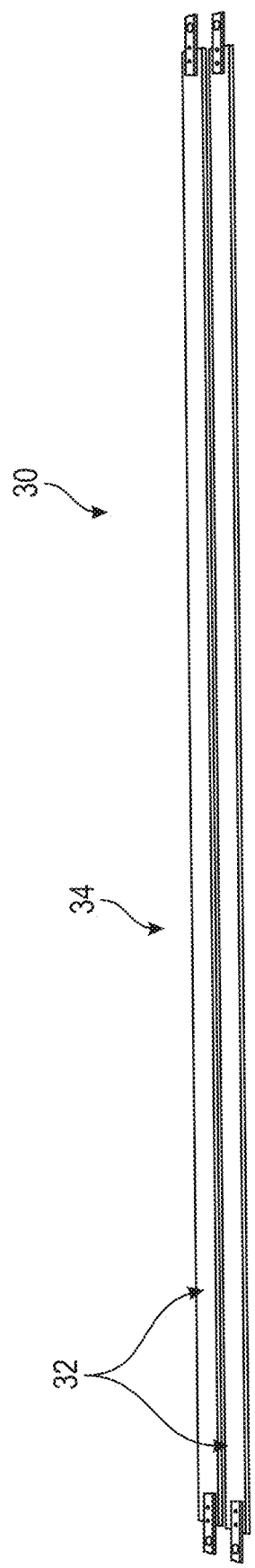
FIG. 3 depicts a printed electrode geometry for use in a longitudinal impedance sensor produced by silk screening a silver containing ink, or other conductive materials, onto a mylar or other non-conductive sheet, and then overprinted with a carbon containing ink, such that the electrodes are exposed externally on the mylar sheet.

FIG. 3 depicts a printed electrode geometry 30 produced by silk screening or printing a silver containing ink 32 directly onto a mylar sheet 34, or printed directly onto a riser tube. The silkscreen print could be gold or other more noble conductor with a carbon overcoat for abrasion resistance. The silkscreen may then be overprinted with carbon. A noble conductor with a carbon overcoat contributes to the elimination of oxidation of the conducted metal. The electrode is then attached to a riser tube of a softener, or printed onto the surface of the riser tube. Although less conductive, the carbon provides for more corrosion and abrasion resistance in water applications. Furthermore, the carbon is applied as a thin coating, and as such will not adversely affect the electrical integrity of the signal.

Figure 4:
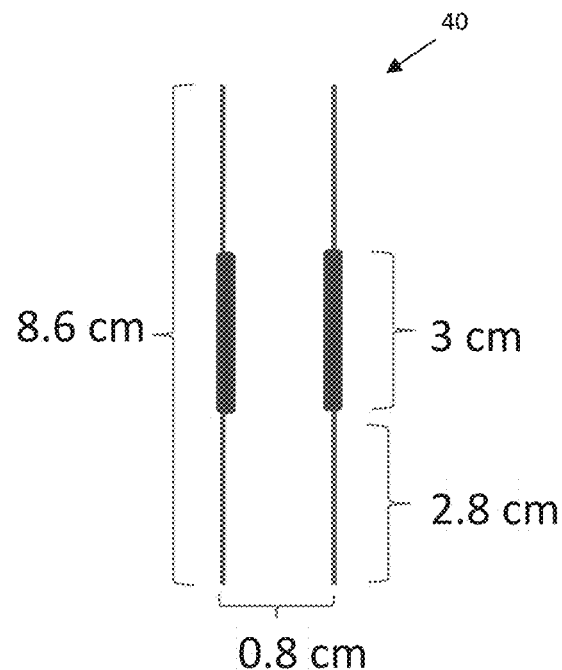
FIG. 4 depicts an illustrative example of a segmented insulated parallel electrode configuration (one or more insulated sections) used to measure and estimate the breakthrough volume of a resin bed.

FIG. 4 depicts an example of an insulated parallel electrode configuration 40 used to estimate the breakthrough volume. Breakthrough is a measure of the maximum permissible ion leakage requiring the production cycle to be shut down. Exemplary dimensions of electrode 40 are shown as being 8.6 cm in total length, spaced 0.8 cm apart, and having a pair of opposing insulation sheaths about each electrode and being 3 cm in length, approximately centered about the top and bottom of the electrode. Other dimensions are feasible, and FIG. 4 represents only an exemplary embodiment. Utilizing the parallel electrode configuration 40 of FIG. 4, in a test configuration, the system resistance was held at 50 ohm, frequency at 2 Khz, and input voltage at 500 mV.

Figure 5:
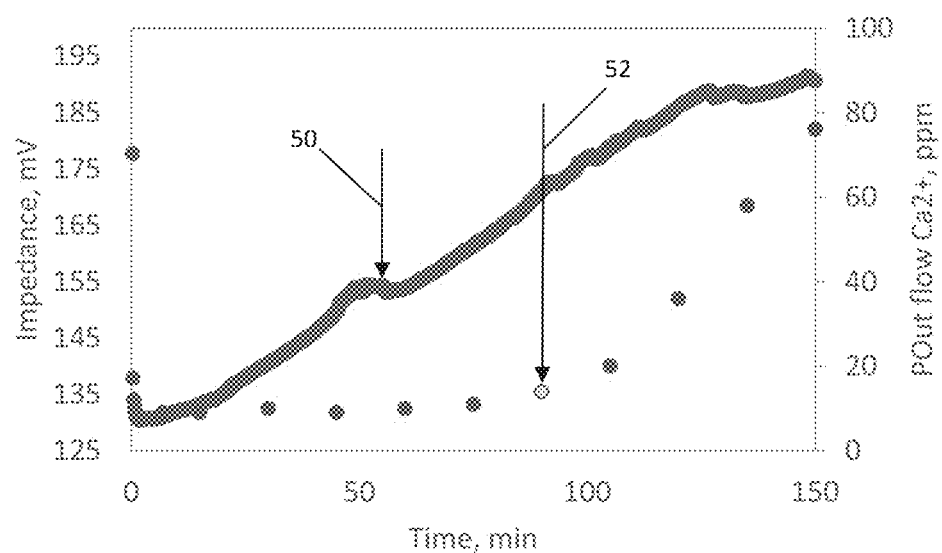
FIG. 5 is a graph of the predicted breakthrough, comparing impedance and the output flow of $Ca^{2+}$ in units of ppm, both measured as a function of time.

FIG. 5 is a graph of the predicted breakthrough of a water softener using the longitudinal electrode configuration of the present invention, comparing impedance and the output flow of $Ca^{2+}$ in units of ppm, both measured as a function of time. This graph represents the output of a "digitized" system, where the measured conductivity/resistivity/impedance between parallel longitudinal conductors is altered by either introducing more space between conductors or insulating material at predetermined, discrete intervals. FIG. 5 is a graphical representation of such a digitized system. The flat portion of the curve, line 50, identifies where the wave front is encompassed by an insulator or at a point of further conductor spacing, and the increasing slope depicts where the wave front has moved past the discrete insulator or conductor spacing. In this example, the ratio of the length of the electrode (until the end of the insulation) divided by the total length of the electrode is equated to the ratio of the volume of water passed until the end of insulation divided by the breakthrough volume.

In prior art applications, the usual procedure during installation is to feed a total hardness value once into the system, and consider the value constant throughout the operational life of the softener. However, as discussed previously, the quality of water changes from season to season, and even within a day, as the supply may comprise different water sources. This inaccuracy ultimately results in either hard water or excess use of salt at the consumer level.

The longitudinal electrode system of the present invention is introduced as a set of two longitudinally placed electrodes attached to a riser tube and implanted within a resin bed, wherein the electrodes respond to a change in resin form from $Na^+$ to $Ca^{2+}$ and/or $Mg^{2+}$.

Figure 6:
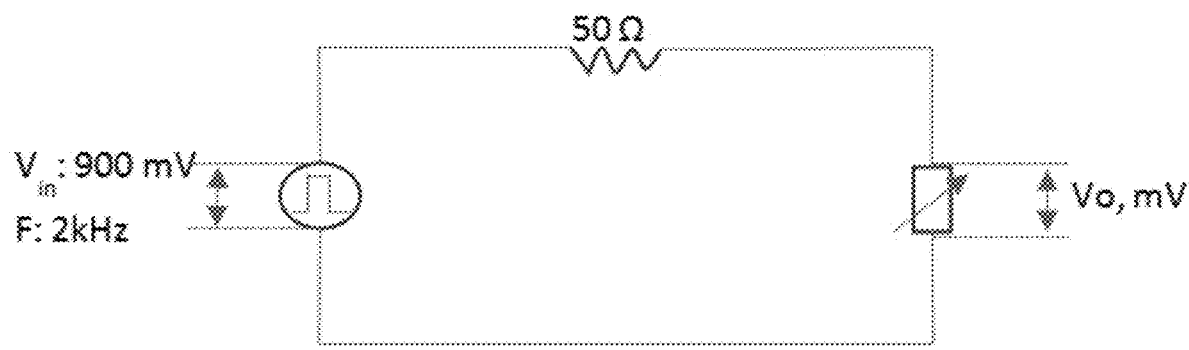
FIG. 6 depicts a simplified electronic circuit used to stimulate an electrode response (Vo) at approximately 100 mV between electrode conductors within exhausted resin.

FIG. 6 depicts a simplified circuit used to stimulate an electrode response ($V_o$) at approximately 100 mV between electrode conductors within exhausted resin. The input voltage signal ($V_{in}$) of this exemplary embodiment was set at 900 mV at a frequency of 2 Khz. A preferred 50 ohm system is used for standardized transmission.

The service cycle was carried out with a flow rate of 15 lpm at a pressure of 42±3 psi in the upstream of the softener. The output response of the electrode ($V_o$) (output potential in mV) was measured with a digital multimeter, and digitally recorded (time (sec) vs. $V_o$ (mV)). Plot time vs. $V_o$ was converted to volume (L) vs. $V_o$ (mV) using an average flow rate calculated during the service cycle. Volume and TDS of water flowing through softener was recorded at regular intervals. Water temperature of softener downstream was recorded. Upstream and downstream of the softener, water samples were collected at regular intervals for measuring TDS and Ca', Mg', and Na ion analysis.

Softener testing with the electrodes was carried by using water having various total hardness (25, 15, 10 g) and TDS (1000, 1500, and 2000 ppm) at various temperatures (10° C., 25° C. and 40° C.).

Testing at Room Temperature and Temperature Compensation

Figure 7:
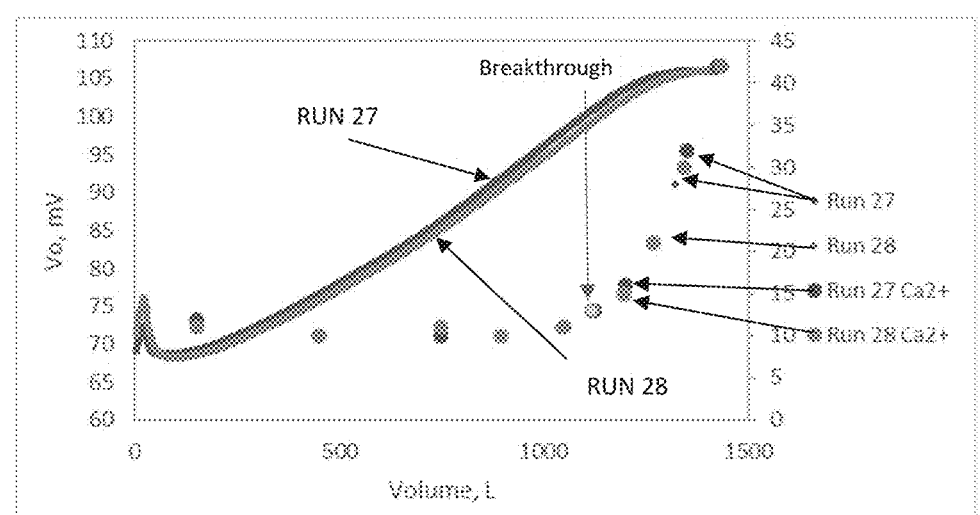
FIG. 7 depicts the response of the electrodes ($V_o$) plotted against water volume (L) passing through the resin bed with water quality of about 25 g at room temperature (25° C.) and with a TDS of about 1000 ppm.

FIG. 7 depicts the response of the electrodes ($V_o$) plotted against water volume (L) passing through the resin bed with water quality of about 25 g at room temperature (25° C.) and with a TDS of about 1000 ppm. Initially it was observed that flow rate (15 lpm vs. 8 lpm) had no effect on slope of the plot.

Figures 8, 9:
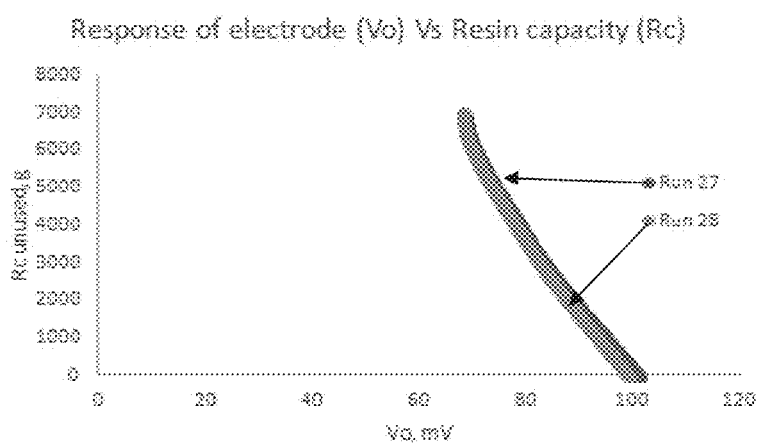
FIG. 8 depicts a chart identifying the estimated total hardness, actual total hardness, corrected total hardness, and percent deviation for each run performed at different temperatures for the example test runs depicted in FIG. 7.
FIG. 9 depicts the response of the electrode $V_o$ (mV) versus the resin capacity (unused) $R_c$ (g) for the example test runs depicted in FIG. 7 until breakthrough by trimming the initial volume of water.

Runs 27 and 28 are depicted. The estimated total hardness for each run was 28.1 g and 27.5 g, respectively at 25° C. The respective actual hardness measured was 25.2 g and 25.6 g for each run, yielding a corrected hardness of 26.0 g and 25.5 g. The range of deviation of expected to actual values over eleven different runs was −5.4% to 7.4%. Additional tests were made at 10° C. and 40° C. FIG. 8 depicts a chart identifying the estimated total hardness, actual total hardness, corrected total hardness, and percent deviation for each run performed at different temperatures.

FIG. 9 depicts the response of the electrode $V_o$ (mV) versus the resin capacity (unused) $R_c$ (g) for Runs 27 and 28 until breakthrough, by trimming the initial volume of water. From volume of water (gal) passed through the softener and measured total hardness TH (g) of water, resin capacity $R_c$ (g) consumed and resin capacity unused or remaining was calculated. In this manner, the following calculations were made:

$$R_c(\text{consumed}) \; (g) = \text{Volume (gal)} \times TH \; (g)$$

$$R_c(\text{remaining}) \; (g) \text{ at given time} = R_c(\text{breakthrough}) - R_c(\text{consumed}) \text{ at given time}$$

The trend line for the plot of FIG. 9 found a best fit with a polynomial 2' order equation. Similarly, testing with various total hardness values at room temperature (25° C.) were plotted and curve fitting was done with polynomial equations. A final Remaining Resin Capacity Equation was derived by averaging all constants.

$$Y = (2.7404x2) - (692.18x) + 41986.2 \qquad (1)$$

where Y is Resin capacity ($R_c$) remaining in grains; and x is electrode response $V_o$ (mV).

The coefficients will vary in measurement for each resin filled vessel. Once the curve fit is established (which is anticipated to be a factory generated curve, dependent upon the variations in individual softener vessels), it may be used to predict the resin remaining.

The empirically derived curve provides a predictive way to estimate resin capacity. One such method is to consider the resin capacity at points in time to and ti. Utilizing a curve fit, such as the exemplary curve of equation (1), the data at the given points in time can be used to estimate feed water hardness. The capacity measured at to is compared to the capacity at ti, where a given measured amount of softened water has flowed through the system. The capacity consumed between to and ti divided by the volume of flow will yield the hardness concentration of the feed water.

Equation (1) estimates the resin capacity (Re) remaining at any given time. The total hardness (TH) of water flowing through resin bed can be estimated as follows:

$$TH\ (g) = R_c\ (g)\ used/[volume\ (gal)\ pass\ through\ resin\ bed] = \Delta R_c/\Delta V \qquad (2)$$

As noted, the electrodes were tested at various temperatures (10° C. and 40° C.) other than room temperature, and at different total hardness levels (10 g, 15 g, and 25 g). A general linear equation was established for temperature compensation of the electrode response ($V_o$):

$$V_{o(25)} = V_{ot}[1 + 0.02(t - 25)] \qquad (3)$$

where $V_{ot}$ is the electrode response at a given temperature; and $V_{o(25)}$ is electrode response at 25° C.

Equation (3), referred to as the temperature compensation equation, normalizes $V_o$ of any temperature to $V_o$ at 25° C. After accommodating for temperature compensation, resin capacity remaining and the total hardness of water can be estimated by using equations (1) and (2).

Figures 10, 11:
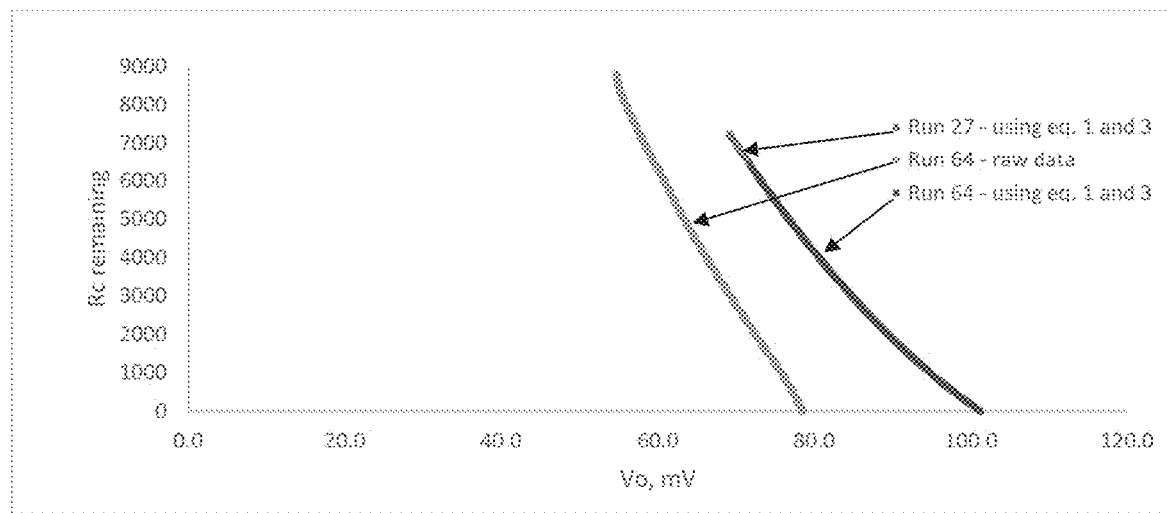
FIG. 10 depicts a table (Table 1) comparing $V_o$ values to estimate resin capacity (Re) and total hardness (TH), wherein Run 27 identified in FIG. 4 along with an additional Run 64 are compared by recording two to three $V_o$ values to estimate resin capacity ($R_c$) and total hardness (TH)
FIG. 11 depicts temperature compensated calculations for Runs 27 and 64 from 40.8° C. to 25° C. utilizing equations (1) and (3)

As an illustrious example, run 27 identified in FIG. 4 along with an additional run 64 are compared by recording two to three $V_o$ values to estimate resin capacity ($R_c$) and total hardness (TH) as shown in FIG. 10 (Table 1). A clear competence in using equations (1) and (3) was observed from FIG. 11. Plots in FIG. 11 depict temperature compensated calculations for runs 27 and 64 from 40.8° C. to 25° C. utilizing equations (1) and (3).

In order to improve the method of estimation, a correction factor was derived from experimental data at various temperatures by regression analysis.

$$TH_{corrected}\ (g) = 4.7003 + 0.7944 * estimated\ hardness\ (g) - 0.04097\ T(°\ C.) \qquad (4)$$

Figures 12, 13:
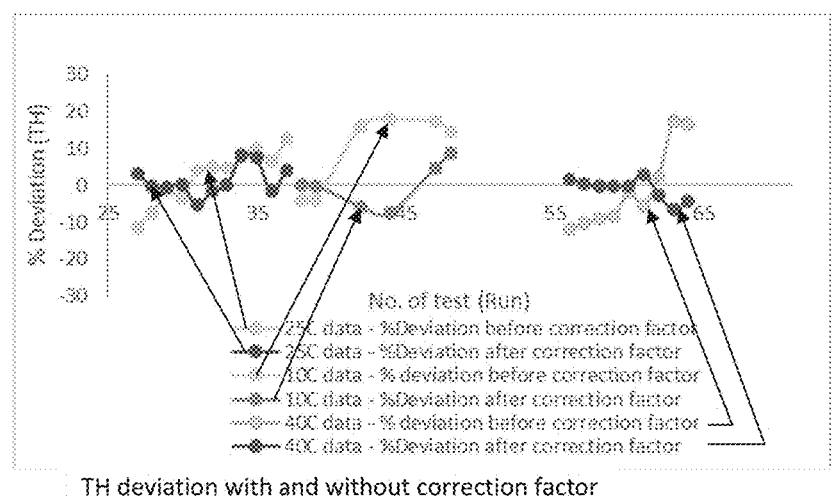
FIG. 12 depicts a table for the correction factor for temperature compensation presenting the accuracy of the method by limiting deviations to less than or equal to 10%.
FIG. 13 presents a comparison of TH deviation (%) with and without the correction factor over several tests conducted at various temperatures (approximately 10° C., 25° C., and 40° C.) with different TH (about 10 g, 15 g, and 25 g)

The correction factor improves the accuracy of the proposed method as shown by limiting deviations to less than or equal to 10%, as depicted in Table 2 of FIG. 12.

FIG. 13 presents a comparison of TH deviation % with and without the correction factor over several tests conducted at various temperatures (approximately 10° C., 25° C. and 40° C.) with different TH (about 10 g, 15 g, and 25 g) but limited to TDS of approximately 1000 ppm.

Effects of TDS on Electrode Response

TDS is a common variable of water quality and its effect must be considered with respect to the electrode response. As given earlier, water with three different TDS values of about 1000, 1500, and 2000 ppm was considered by fixing total hardness (TH) as 25 g and temperature (T) at about 25° C.

Initial water values for total hardness (TH) was about 25 g and 1000 ppm of TDS. Any changes from this water quality required an addition of deionized water (with 1 or 2 μS/cm) and NaCl (grade purity >99.5%). To bring TDS to 1500 and 2000 ppm extra NaCl was added to water and mixed with a recirculation pump for about three hours by checking TDS at regular intervals.

Figure 14:
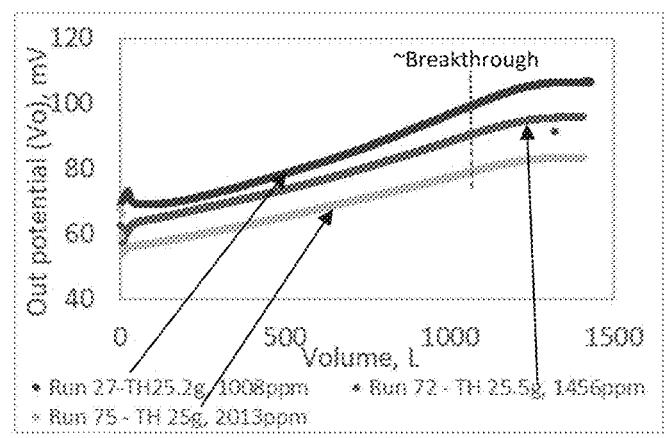
FIG. 14 depicts the results of output potential $V_o$ (mV) as a function of volume (L), and indicating breakthrough for three different runs.
Figure 15:
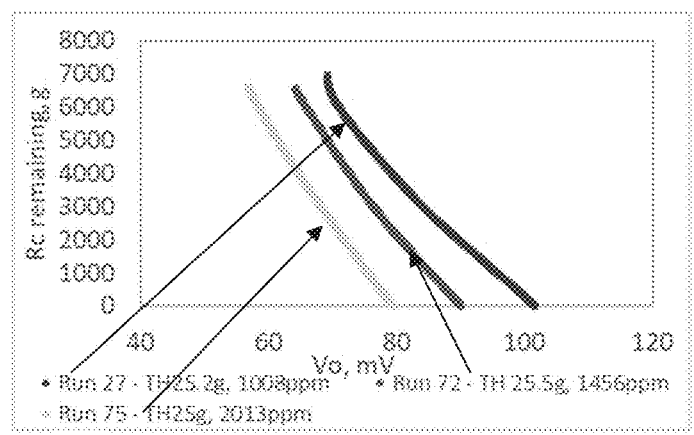
FIG. 15 depicts the results of resin capacity $R_c$ as a function of Vo (mV)

Results of these tests are depicted in FIGS. 14 & 15. FIG. 14 depicts the results of output potential $V_o$ (mV) as a function of volume (L), and indicating breakthrough for three different runs. FIG. 15 depicts the results of resin capacity $R_c$ as a function of $V_o$ (mV). This demonstrates that TDS is observable as offset change with a more limited slope change, in contrast with effect of temperature, which contributes more to slope change. The effect of TDS on slope was considered minimal.

Figure 16:
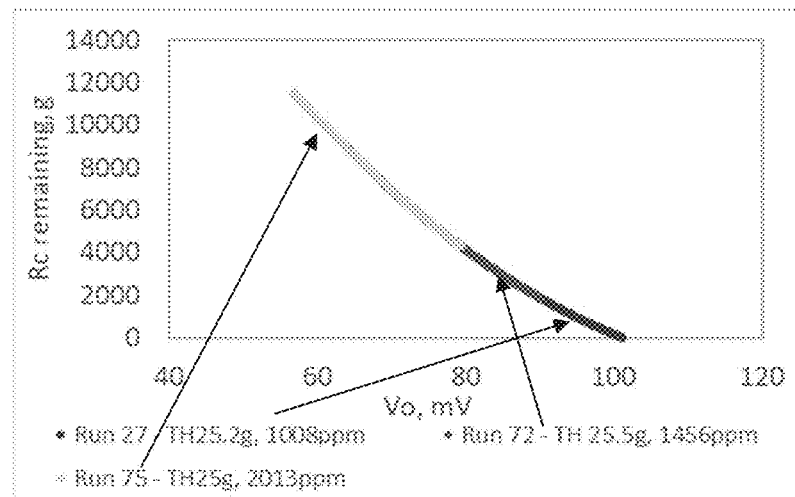
FIG. 16 depicts the effects of TDS on $R_c$ versus $V_o$, after temperature compensation.

Similar results are depicted in FIG. 16, which was derived using temperature compensation equation (3). FIG. 16 depicts the effects of TDS on $R_c$ versus $V_o$, after temperature compensation.

Figure 17:
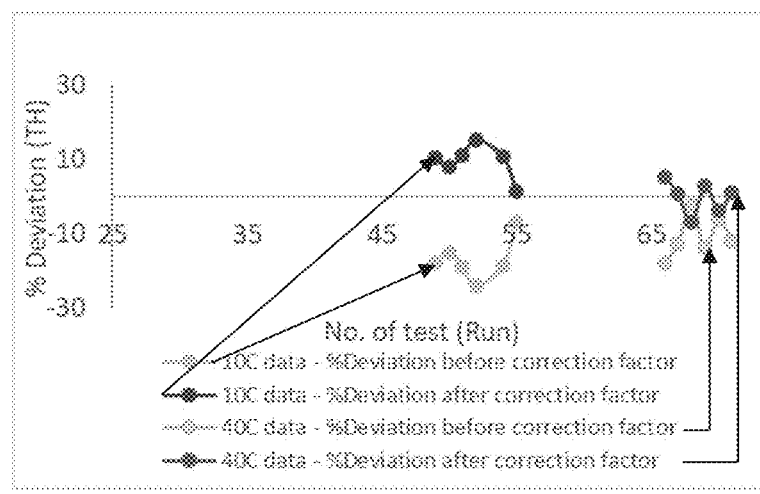
FIG. 17 depicts results from the tests conducted under FIG. 16 with 1500 ppm and 2000 ppm of TDS.

From the tests conducted with 1500 ppm and 2000 ppm of TDS, the TH deviation (%) results with and without a correction factor (using eq. 4) are shown in FIG. 17. A clear improvement of estimated TH with the exemplary sensor was observed, confirming that the method developed has minimal TDS effect.

Finding Early Breakthrough for the Softener

Typical softener flow meters are unable to measure flow below 0.3 gal/min. This means a considerable volume of water below this flow rate may flow through the softener and consume resin capacity. Over a period of several regenerations, the softener may provide untreated water.

One solution presented by an embodiment of the present invention is to decrease the electrode length or limit the electrode length above the lower diffuser, making it possible to observe a stable $V_o$ before breakthrough.

Figure 18:
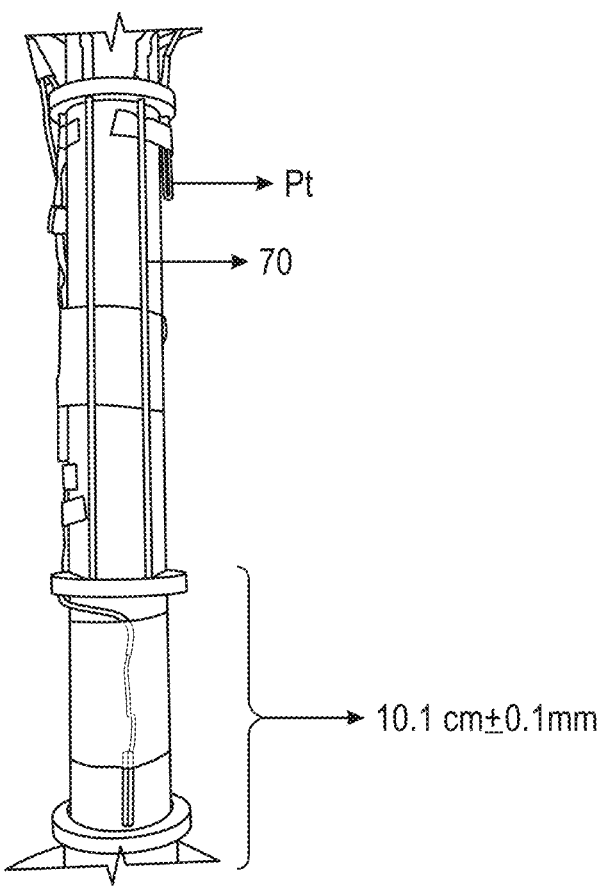
FIG. 18 depicts an electrode configuration for establishing an early breakthrough point where the electrode is terminated a distance from the lower diffuser.

FIG. 18 presents an electrode configuration for establishing an early breakthrough point. Electrode 70 is terminated a 10 cm distance from the lower end of the electrodes to the lower diffuser.

Figure 19:
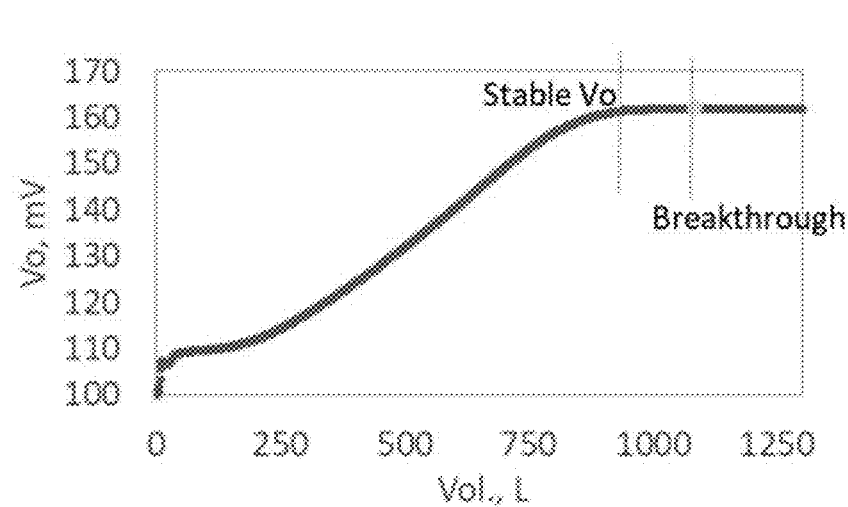
FIG. 19 depicts the stabilizing of $V_o$ (by approximately 8% by volume) before breakthrough (soft water with TH of ~1 g)

As depicted in FIG. 19, fixing electrodes 10 cm above the lower diffuser stabilizes the $V_o$ reading by approximately 8% by volume before breakthrough (soft water with threshold hardness of ~1 g).

Once the hardness front crosses the lower tip of electrode, a change in response with change in resin bed resistance will ultimately stabilize and reach the flat region of plot as shown in FIG. 19. At this point of time, regeneration can trigger with extra fill time and fill volume to shift the operating region of resin bed back to normal. This will ensure always to provide a user with soft water while shifting the operating region of resin bed, and further to correct for the volume of water passing through resin bed.

Effect of Flow Rate and Flow Conditions

Figure 20:
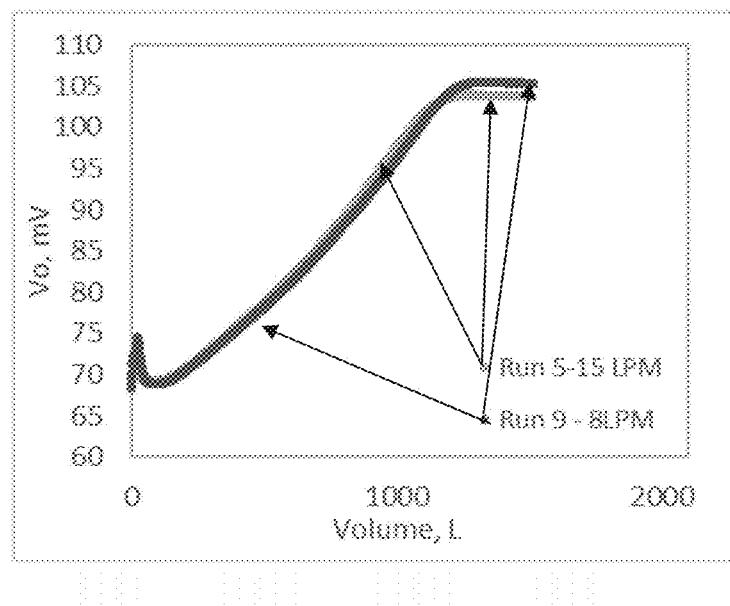
FIG. 20 depicts the effect of flow rate of the electrode response service cycle on $V_o$ v. $V_L$.
Figure 21:
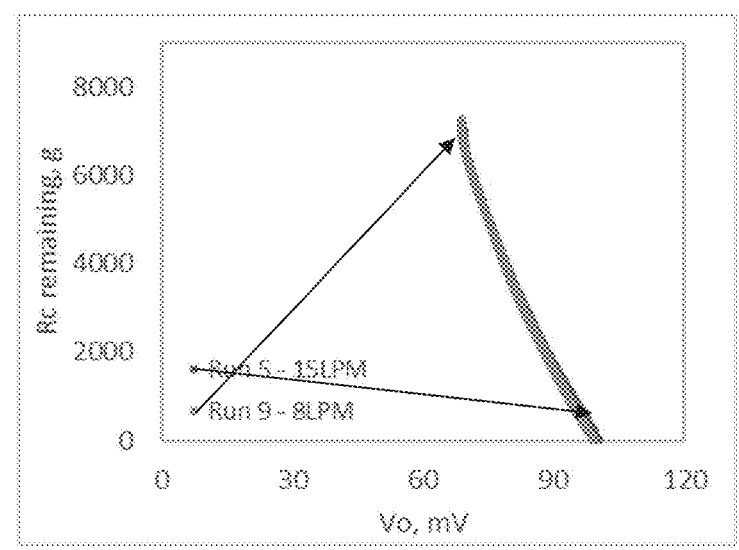
FIG. 21 depicts the effect of flow rate and FIG. 21 depicts the effect of flow rate on $R_c$ v. $V_o$.

To better understand the effects of flow rate on an electrode embodiment of the present invention, a service cycle was carried at different flow rates of 15 lpm and 8 lpm with continuous flow. From these tests, it was demonstrated that flow rate has no effect on slope of plot with respect to volume of water passed and $R_c$ remaining. FIG. 20 depicts the effect of flow rate on $V_o$ v. $V_L$, and FIG. 21 depicts the effect of flow rate on $R_c$ v. $V_o$. This is no appreciable difference between the respective curves.

Figure 22:
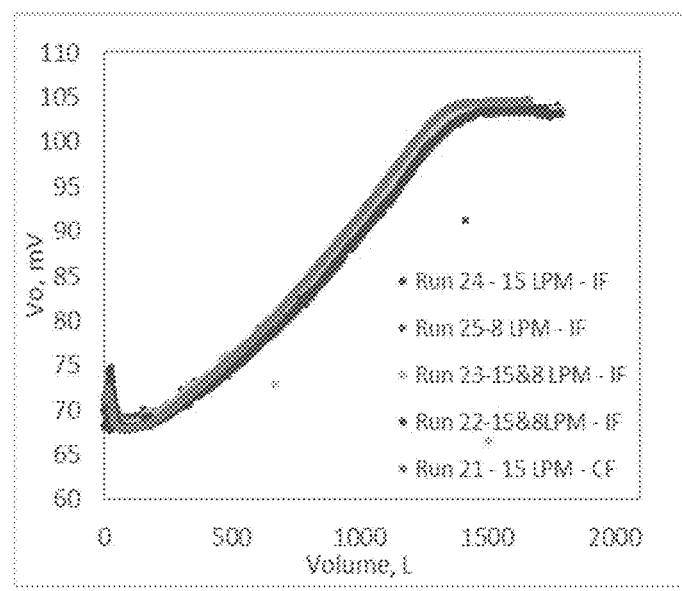
FIG. 22 depicts the effect of flow conditions on $V_o$ v. $V_L$.
Figure 23:
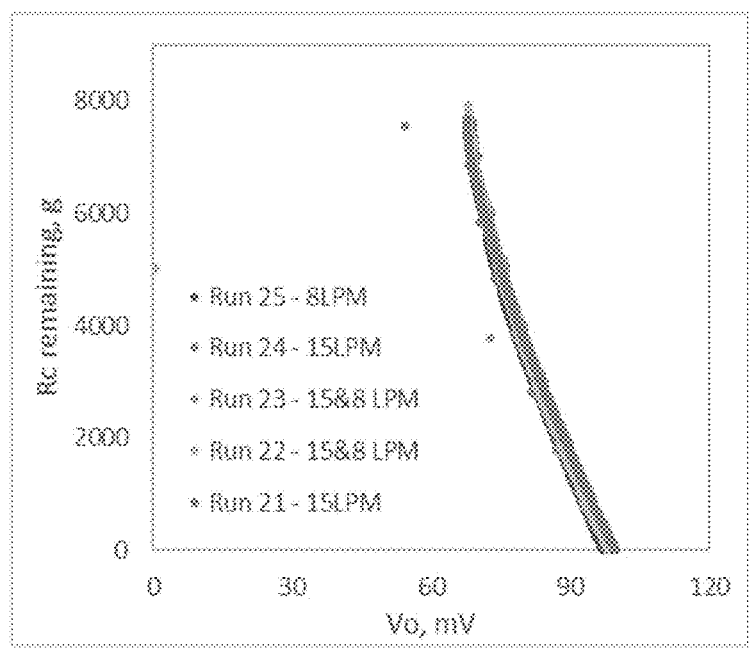
FIG. 23 depicts the effect of flow conditions on $R_c$ v. $V_o$.

The longitudinal impedance sensor was tested under various flow conditions/patterns, e.g., continuous flow (CF), and intermittent flow (IF), representing an interval of flow for 10 minutes and no flow for 10 minutes. No change in slope as a function of flow condition was observed (FIGS. 22 and 23), which included the changes with flow rates. FIG. 22 depicts the effect of flow conditions on $V_o$ v. $V_L$, and FIG. 23 depicts the effect of flow conditions on $R_c$ v. $V_o$.

Time and Volume Required to Reach Uniform Temperature of Resin Bed

Usually softener and resin bed are at ambient temperature or room temperature whereas, water might be at a different temperature. $V_o$ of electrode is predicated upon an average resistance of resin bed and dependent on resin bed temperature. Hence, it is necessary to consider the uniform temperature of the resin bed required to record the proper response of electrode.

As an illustrative example, three temperature sensors (Pt100) were installed in the resin bed at various depths (top, middle, and bottom of the electrode depicted in FIG. 18) to investigate the temperature uniformity of resin bed. Various volumes of water at different flow rates were passed through the resin bed while recording the temperature. The temperature of the water used for testing was varied, with low temperature at approximately 11° C., room temperature at approximately 26° C., and high temperature at approximately 39° C.

Figure 24:
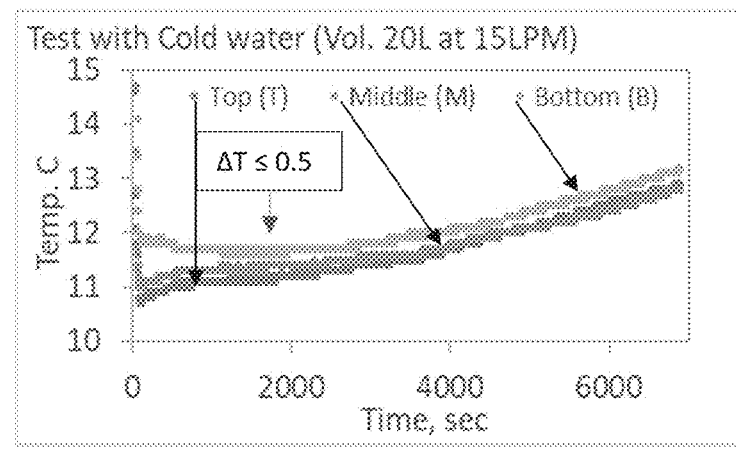
FIG. 24 depicts a plot to find early breakthrough measuring cold water temperature versus time.
Figure 25:
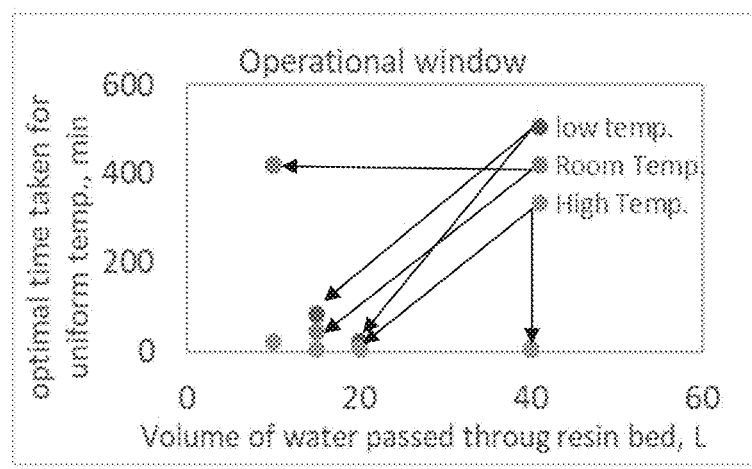
FIG. 25 depicts a plot to show the operational window for the electrode of the present invention, plotting optimal time for uniform temperature as a function of volume of water passed through the resin bed.

It was found that an optimal time of 30 minutes at a volume of 20 L (four times the softener net volume) was sufficient to obtain uniform temperature, irrespective of water temperature. FIG. 24 depicts a plot to find early breakthrough measuring cold water temperature versus time. FIG. 25 depicts a plot to show the operational window for the electrode of the present invention, plotting optimal time for uniform temperature as a function of volume of water passed through the resin bed.

In the aforementioned plots, uniform bed temperature was determined when the temperature difference between the sensors was ≤0.5 (i.e., the limitation of Pt100 temperature sensor).

Referring to FIG. 25: a) if 40 L or greater volume of water passed through the resin bed (8 times of net softener volume) the output response of the electrodes could be recorded immediately irrespective of water temperature; and b) if the water temperature is at 40° C. or at room temperature, the resin bed reaches a uniform temperature in 20 minutes with 15 L (three times the net softener volume).

Blending

Certain markets, such as European markets, remain interested in blending soft water with hard water (upstream) to get small quantities of hardness ions while avoiding some effects of the silky nature of treated water. Thus, the valve of the current invention is adjusted to set a required blending percentage or desired hardness downstream of the softener. In testing the sensor and method for blending, the total hardness, TH, was limited to 2 g and 5 g of downstream water.

The blending ratio was calculated from the estimated TH and required TH of blended water. The ratio of actual TH measured to blending ratio gives a TH of blended water. Total hardness of blended water from estimated total hardness values with correction factor (equation (4)) was plotted as shown in FIGS. 26 and 27.

Figure 26:
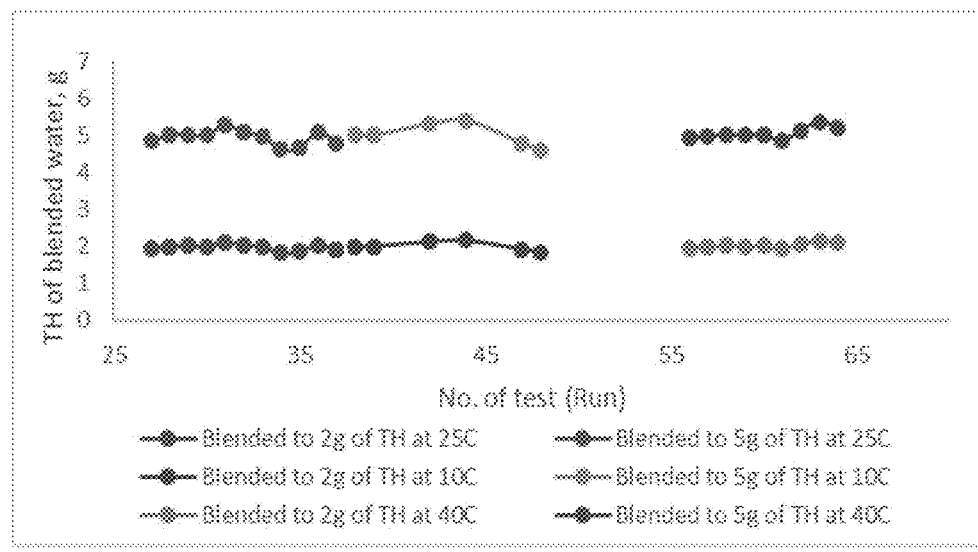
FIG. 26 depicts a number of runs for the total hardness of blended water for 2 g and 5 g respectively at 10° C., 25° C., and 40° C.

FIG. 26 depicts a number of runs for the total hardness of blended water for 2 g and 5 g respectively at 10° C., 25° C., and 40° C.

Figure 27:
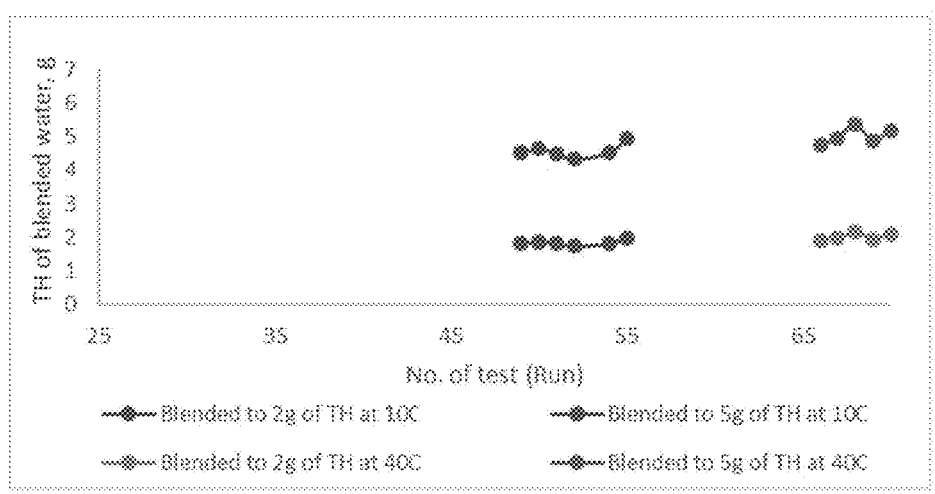
FIG. 27 depicts a number of runs for the total hardness of blended water with high TDS for 2 g and 5 g respectively at 10° C. and 40° C.

FIG. 27 depicts a number of runs for the total hardness of blended water with high TDS for 2 g and 5 g respectively at 10° C. and 40° C.

The calculated total hardness of the blended water was limited to below one half a grain in most instances.

Flow Procedure for Estimating Total Hardness of a Softener Upstream

Figure 28:
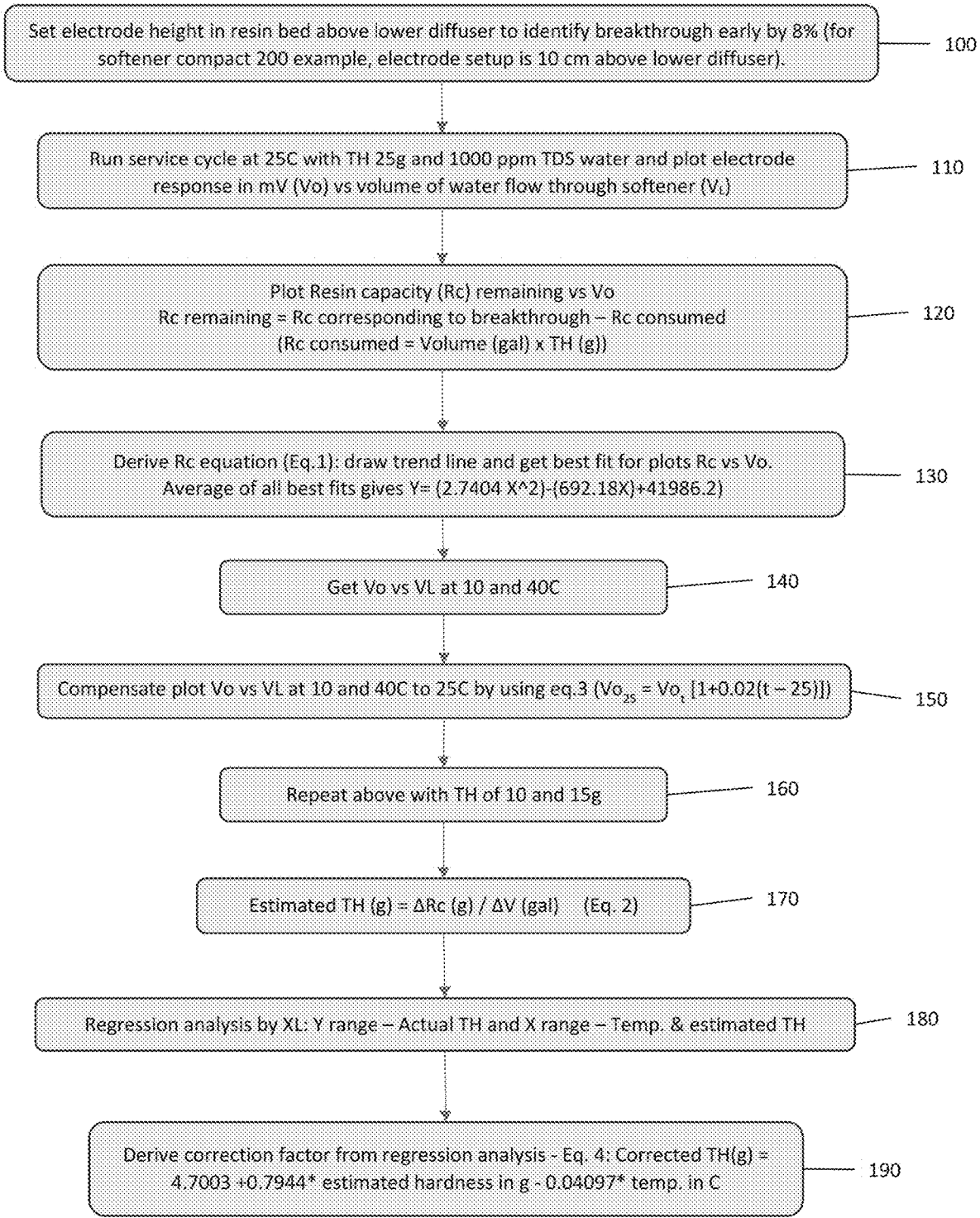
FIG. 28 is a flow chart depicting the flow procedure for estimating the total hardness upstream of the softener.

FIG. 28 is a flow chart depicting the flow procedure for estimating the total hardness upstream of the softener using a longitudinal impedance sensor.

Referring to FIG. 28, in a first step 100, the electrode height in the resin bed is set above the lower diffuser to identify the breakthrough early, generally by about 8%. Next, in step 110, the service cycle is run at 25° C. with a total hardness of 25 g and 1000 ppm TDS water. The electrode response is plotted ($V_o$ in mV) versus volume of water flow through the softener ($V_L$).

In step 120, the resin capacity $R_c$ remaining is plotted versus $V_o$. The resin capacity remaining is equated to the resin capacity corresponding to breakthrough minus the resin capacity consumed, where the resin capacity consumed is the product of the volume (gallons) and total hardness (grams), i.e., $R_{c\text{-}consumed}$=Volume (gal)×TH (g).

Next, step 130, the resin capacity, $R_c$, is derived from equation (1). A trend line is calculated for best fit. An empirical derivation of best fit plots is utilized. In the instant case, this fit has been shown to follow the equation:

$$Y = 2.7404x^2 - 692.18x + 41986.2 \quad (5)$$

The coefficients will alter and depend upon the vessel being measured, which is anticipated to be performed in a factory setting. In step 140, the $V_o$ versus $V_L$ plots are obtained for 10° C. and 40° C.

Next, step 150, the $V_o$ v. $V_L$ plot is compensated by using equation (3) to obtain $V_{0.25}$.

The method steps above are repeated with total hardness values of 10 g and 15 g (step 160). In step 170, the total hardness TH(g) is estimated from the ratio of the change in resin capacity (ΔRe) and change in volume (ΔV(gal)).

A regression analysis is performed (step 180) where: $Y_{range}$–Actual TH; and $X_{range}$–temperature and estimated TH are considered.

Last, in step 190, the correction factor was derived from the regression analysis (equation (4)):

$$\text{Corrected TH(g)} = 4.7003 + \text{estimated hardness (g)} - 0.04097 * \text{temp}(° C.) \quad (6)$$

The service cycle was continued slightly after breakthrough until 40 ppm of $Ca^{2+}$ concentration in output flow was observed (downstream of the softener) with $V_o$ being stable.

It is noted that the aforementioned polynomial is a model of a specific sensor in a specific unit that relates the capacity remaining in the bed to the measured $V_o$. The remaining capacity can be determined by using the model at any point in the exhaustion process. The polynomial is predetermined, i.e., factory set, predicated upon the different water softener vessel variables.

Using this control algorithm, it is possible to keep track of the flow through the softener in gallons of water/unit time, and having a preset hardness value, the capacity exhausted from this water flow can be calculated. With knowledge of prior softener regeneration and how much capacity is present in the regeneration, it is possible to estimate how many gallons of water remain, when the next regeneration sample will be needed, and how much salt will be required to generate enough capacity to keep the softener running for some expected period of time.

Using the $V_o$ value from the sensor, it is possible to determine how much capacity is remaining in the softener bed. The response is somewhat unpredictable (noisy) for the first few gallons, insomuch as rinsing of the last of the regenerating salt from the unit affects the resistance value from that rinse more than from bed exhaustion, but once the initial flow is complete, $V_o$ may be accurately measured, and the remaining capacity in the bed may be determined. Subsequently, the softener is allowed to operate producing some measured amount of softened water. $V_o$ is measured and the remaining capacity is determined.

The difference in the starting capacity and the remaining capacity/volume of flow provides for the inlet hardness. The remaining capacity/inlet hardness provides the remaining volume capacity of the softener operating with water at a current hardness level. In this manner, the instant invention yields a real time measurement of remaining capacity that can be coupled with a time/flow rate measurement to establish total flow between capacity measurements, which determines the residual capacity in the bed and the rate of capacity consumption. This allows for predicting when to initiate regeneration.

Complete Cycle of Operation

A complete cycle of operation is described, referring to the numbered parts in the attached drawings.

First, a new softener with fresh resin 12 is installed. After plumbing for the brine or regeneration solution 5, the regeneration waste stream 6, the hard water inlet 7, the soft water outlet 9, and blending valve 8, water containing hardness (calcium, magnesium) and potentially iron is allowed to enter through the inlet 7. This water may be channeled from either bottom up 26 or from top down depending on the softener design.

The "hard" water comes in contact with the resin 12 and hardness and iron ions are exchanged for sodium ions on the surface of the resin.

Impedance sensor 14 monitoring impedance (resistivity, conductance, capacitance) measures the change in the resin charge as sodium ions are exchanged.

As the resin is exchanged at the top (or bottom depending on softener design), hard water passes through the exchanged resin and a "hardness front" 12c forms at the boundary of depleted resin 12b that has been exchanged and the resin that has not been exchanged 12a.

The sensor 14 monitors this hardness front through the systems electronics, processor, and associated algorithm(s), which also monitor the flow through the system.

This information, along with historical data on water usage by time of day is used to trigger regeneration at a convenient time of the day when water consumption is low since the system must be placed in bypass by the softener valve 4. Once a regeneration is triggered, the inflow into the softener is stopped in the valve 4 and regenerant (typically a saturated sodium solution) is pumped into the resin bed 12 from the opposite direction used during normal operation. This regenerant exits the resin bed and is typically sent to the regeneration waste stream 6 (i.e., the drain).

The sensor 14, electronics, and processor will monitor this process to determine when the regenerant trailing edge leaves the stack.

The next step is a slow rinse followed by a fast rinse, both of which are monitored by sensor 14 to determine when those processes are completed based on conductivity changes in order to minimize water usage.

Following the rinse cycles, valve 4 is set to operating mode. Hard water enters the softener and depending on how much water enters, which is preferably monitored by a flow sensor, and the identification of a new hardness front, the system can calculate the next regeneration event.

It is noted that during operation, the amount of hardness could change and the hardness front would slow down. However, based on the foregoing measurements, it is possible for the electronics and on-board processor to determine the hardness (hardness number) of the water.

This hardness number could also be used by the softener's processor and algorithm to adjust (automated) blending valve 8 if 100% softened water is not desirable. Being able to calculate the hardness of the incoming water is critical to the bypass valve's proper metering of untreated water to achieve the desired output hardness.

This process would also allow the automatic startup of a softener without having to input the hardness of the incoming water at the time of installation since the system can calculate the hardness based on the sensor's monitoring of the resin bed's depletion as a function rate of flow.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for measuring and tracking movement of hardness in a water softener, said method comprising:
   introducing hard water from a point of entry into a vessel containing a particle bed of ion exchange material;
   electrically connecting a controller to electrodes;
   situating said electrodes within said vessel such that said electrodes traverse an axial length of said vessel in a longitudinal direction from approximately vessel top to approximately vessel bottom, and extending through said particle bed of ion exchange material;
   measuring impedance, conductivity, and/or resistivity between electrodes using said controller;
   calculating from said impedance, conductivity, and/or resistivity measurements a state of the exhaustion or depletion of said ion exchange material in said vessel;
   initiating a regeneration of said ion exchange material upon determination of exhaustion or depletion of said ion exchange material.

2. The method of claim 1 wherein said step of initiating said regeneration further includes ceasing inflow of said hard water and pumping a regenerate into said ion exchange material.

3. The method of claim 1 further including utilizing historical data on water usage as a function of time to assist in determining said step of initiation of said regeneration.

4. The method of claim 2 including pumping said regenerate into said ion exchange material from a direction opposite that of water flow during normal operation.

5. The method of claim 1 further including monitoring said impedance, conductivity, and/or resistivity to determine when a regenerate trailing edge or front is removed from the ion exchange material.

6. The method of claim 5 including initiating a slow rinse followed by a fast rinse, and monitoring said conductivity, impedance, and/or resistivity during either or both of said rinses to determine when either or both of said rinses are complete based on impedance, conductivity, and/or resistivity changes.

7. The method of claim 6 including introducing hard water to said water softener, and identifying a new hardness front by measuring impedance, conductivity, and/or resistivity between said electrodes.

8. The method of claim 1 including introducing a blending valve to blend said hard water with softened water if a mixture of hard water/softened water combination is desired.

9. The method of claim 1 including calculating the average impedance, conductivity, or resistivity of said ion exchange material within said vessel, wherein said average impedance, conductivity, or resistivity is proportional an amount of regeneration of said ion exchange material within said vessel.

10. The method of claim 1 including calculating and monitoring the relationship between impedance, conductivity, and/or resistivity of said ion exchange material and capacity of said ion exchange material being depleted.

11. The method of claim 1 including comparing input volume of water flowing into said vessel to capacity of ion exchange material being used or depleted, and from this comparison, comparing said capacity to impedance, conductivity, and/or resistivity measured by said electrodes, such that capacity of said ion exchange material can be ascertained in-situ.

12. The method of claim 1 including calculating run-to-run conductivity of a given amount of brine solution to resin capacity to gauge use life of the resin and suggest replacement time.

13. The method of claim 1 where a proportional valve is controlled to deliver a blend of hard and soft water to control an amount of silkiness of said blend of hard and soft water or amount of sodium to be consumed.

14. The method of claim 1 where an output of the softener is split between a supply to a water heater and a cold water line in a home and where said cold water line is first put through a proportional valve to control an amount of hardness of the water, thereby allowing a user to control the hardness of the water in-situ without affecting the soft water supply to the hot water heater.

\* \* \* \* \*

UNITED STATES PATENT AND TRADEMARK OFFICE
CERTIFICATE OF CORRECTION

PATENT NO. : 11,981,583 B2
APPLICATION NO. : 18/300653
DATED : May 14, 2024
INVENTOR(S) : George Dimotsis and Malcolm Kahn It is certified that error appears in the above-identified patent and that said Letters Patent is hereby corrected as shown below:

In the Specification

Column 14, Line 14, reads:
Ca', Mg', and Na ion analysis
Should read:
--$Ca^{2+}$, $Mg^{2+}$, and $Na^+$ ion analysis.--

Column 15, Line 40, reads:
THcorrected (g) = 4.7003 + 0.7944 * estimated hardness (g) - 0.04097 T(oC) (4)
Should read:
--THcorrected (g) = 4.7003 + 0.7944 * estimated hardness (g) - 0.04097 * T(oC) (4)--

Signed and Sealed this
Tenth Day of December, 2024

Katherine Kelly Vidal
*Director of the United States Patent and Trademark Office*